July 3, 1956

E. F. FISHER 2,752,911

SALAMANDER TYPE HEATING APPARATUS

Filed Oct. 28, 1954

INVENTOR.
ERNEST F. FISHER
BY

INVENTOR.
ERNEST F. FISHER

United States Patent Office 2,752,911
Patented July 3, 1956

2,752,911

SALAMANDER TYPE HEATING APPARATUS

Ernest F. Fisher, York, Pa.

Application October 28, 1954, Serial No. 465,300

2 Claims. (Cl. 126—90)

This invention relates to a salamander type heating apparatus for space heating and for drying objects in enclosed spaces.

One of the principal objects of the invention is to provide a simple, practical, low cost and efficient heating appartus wherein products of combustion are mixed with recirculated or fresh air to produce heated air for various uses.

Another object of the invention is to provide a salamander type heater that will be useful not only for heating but will serve also as an air circulating unit for ventilating comfort purposes when heat is not required.

Still another object of the invention is to provide a heating apparatus that will be effective, even when electric power is not available for driving an electric fan, to circulate the air.

Details of the foregoing objects and the invention are set forth in the following specification and illustrated in the drawings comprising a part thereof.

Figure 2:
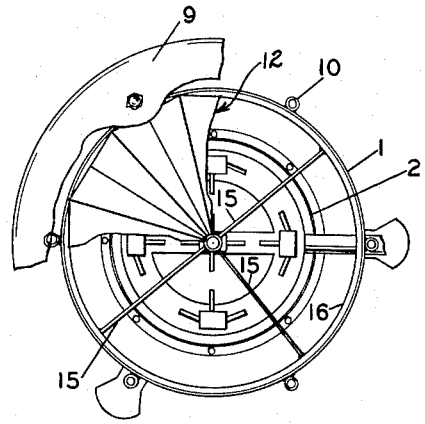
Fig. 2 is a fragmentary plan view taken on line 2—2 of Fig. 1.
Figure 1:
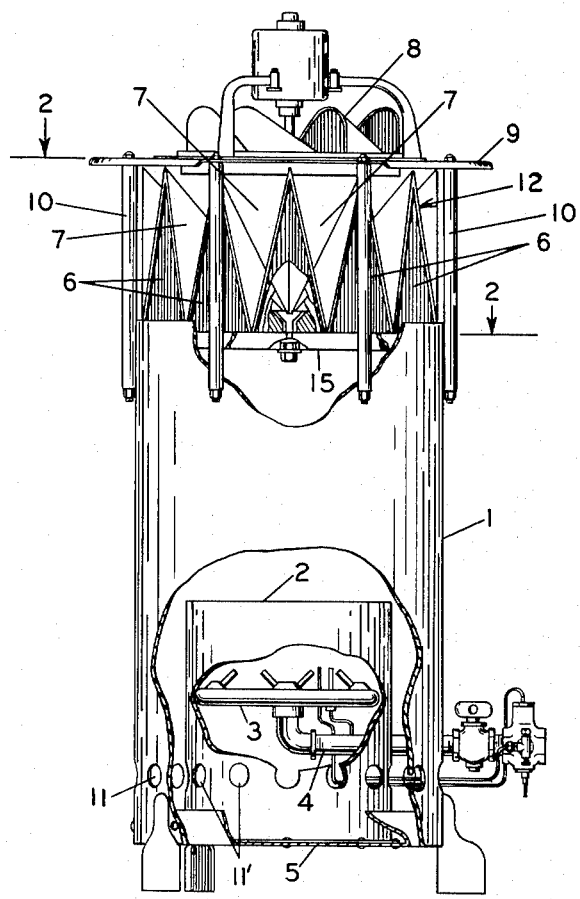
Fig. 1 is a vertical elevation showing the preferred embodiment of the heater, part thereof being cut away to illustrate details.

Referring to Figs. 1 and 2 of the drawings, the salamander type heater comprises a vertical cylindrical shell 1 which encloses a concentric casing 2 in its bottom end, the two casings having an annular space therebetween. Casing 2 encloses burner 3 which is connected to a gas supply and regulating means through connecting pipe 4. Casing 2 has a closed bottom 5 which is common with shell 1 and completely closes the bottom ends of both the shell 1 and casing 2.

The top of shell 1 is surmounted concentrically by the distributing head 12 which is supported at its axis by radial bars 15 which are fixed at the outer ends thereof to ring 16 that is welded or otherwise secured to shell 1. The distributing head 12 comprises an irregularly shaped deflector or baffle formed with a multiplicity of ridges angularly spaced circumferentially about the axis of the heater and extending radially outwardly and upwardly from said axis. Said deflector comprises a plurality of segmental panels, respective pairs of which unite along each of said ridges and the lower edges of which unite along substantially horizontal and radial lines. These panels form a continuous series of alternate inverted V-shaped and V-shaped outlet openings 6 and 7 arranged circumferentially about the vertical axis of shell 1, all of which is clearly shown in Figs. 1 and 3. Outlets 6 communicate with the interior of shell 1 so as to discharge hot products of combustion laterally outward, and outlets 7, which comprise spaces between outlets 6, discharge ambient air from fan 8 laterally between the discharged products of combustion from outlets 6. Fan 8 is supported by an annular plate 9 which is connected to shell 1 by vertical rods or bars 10 which are welded to the exterior of shell 1 and extend above the head 12. Any suitable means as an electric motor may be used to drive fan 8, the same being supported from plate 9 by a frame such as spider.

Referring to Fig. 1 air for both primary and secondary combustion in burner 3 enters through inlet ports 11 in shell 1 and thence through inlet ports 11' in burner casing 2, these ports preferably being substantially opposite each other. A portion of the air flowing through ports 11 in shell 1 also flows upward through the annular space between the interior of shell 1 and casing 2 so as to cool shell 1, and this air also mixes with the products of combustion from burner 3 and is discharged therewith through outlets 6.

The ambient air discharged through outlets 7 by fan 8 and said hot products of combustion readily diffuse and mix with each other as they leave their respective outlets and form a circular stream of heated air which is projected radially outwardly from distributing head 12 and is discharged substantially uniformly through a complete arc of 360 degrees.

Figure 4:
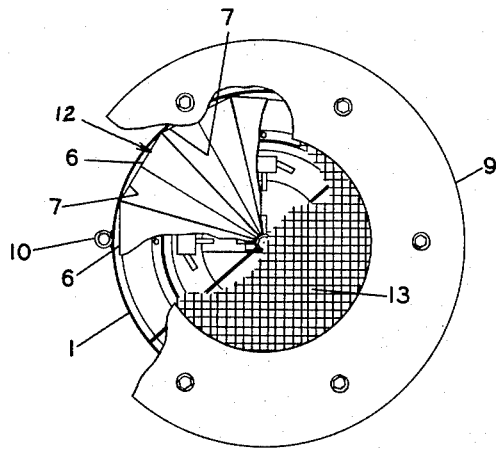
Figs. 3 and 4 are elevation and plan views respectively similar to Figs. 1 and 2 but illustrating a heater in which no fan is used and a grilled opening is provided in lieu of the fan.
Figure 3:
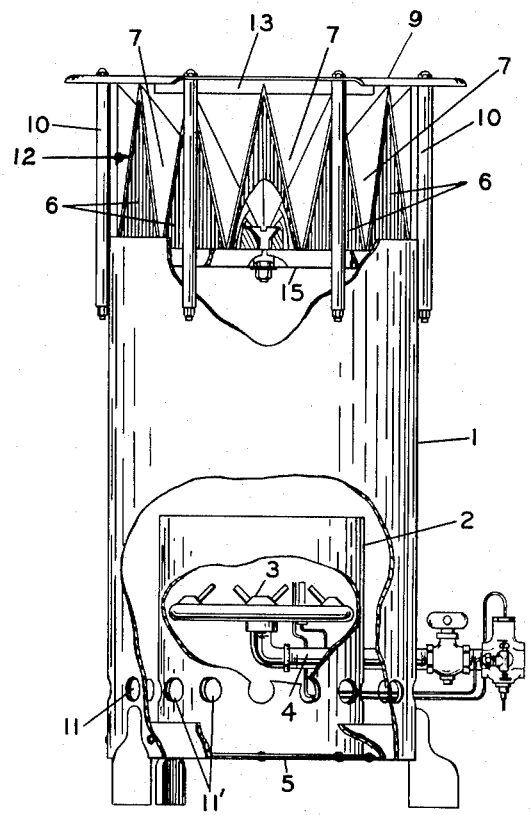

Referring to Figs. 3 and 4, a heater is shown in which fan 8 is replaced by a plate 9 having a grilled opening 13 through which ambient air is pulled by the aspirating effect of the radially outward flow of hot products of combustion from outlets 6. The high velocity of the hot products of combustion through outlets 6 produces a decided aspirating effect and pulls the ambient air through grilled opening 13 and the contiguous ambient air outlets 7, resulting in a circular stream of radially discharged, heated air similar to that produced by the heater shown in Figs. 1 and 2, as described above.

Thus, it is seen that the heating apparatus as described is of novel construction, practical and advantageous as a means for generating hot air for heating space.

It will be understood of course that deviations and modifications may be made in the details of the invention without departing from the spirit thereof as claimed.

I claim:

1. A salamander type heating apparatus comprising in combination, a gas burner, a cylindrical vertical casing open at the top and closed at the bottom and surrounding said burner, said casing having ports arranged to supply air for primary combustion to said burner, a cylindrical shell substantially concentric with and surrounding said casing in spaced relationship therewith, said shell being open at its top and closed at its bottom and being provided with air inlet ports arranged to provide combustion air for said burner and also air movable upward past said casing and operable to cool the wall of said shell, said air inlet ports of said shell being substantially opposite the air inlet ports of said burner casing and the open upper end of said shell extending substantially above the open upper end of said burner casing, a multiple discharge head surmounting the open end of said shell comprising an irregularly shaped deflector formed with a multiplicity of ridges angularly spaced circumferentially about the axis of the heater and extending radially outwardly and upwardly from said axis, said deflector comprising a plurality of segmental panels respective pairs of which unite along each of said ridges and other edges of which meet along substantially horizontal and radial lines, said panels forming a series of alternate V-shaped and inverted V-shaped outlet openings arranged circumferentially about the axis of said shell, said openings respectively being capable when the apparatus is functioning to discharge ambient air and products of combustion and the radial extent of the entire outer edges of said panels defining said outlets being substantially equal to the radius of said shell.

2. The heating apparatus set forth in claim 1 further including a plurality of vertical rods circumferentially spaced around said shell and extending upwardly therefrom, the lower ends of said rods being connected to said shell and the upper ends extending above said deflector, an annular plate supported by the upper ends of said rods and overlying said deflector, and an electric motor driven fan supported by said plate above the central opening therein and operable to force ambient air against the upper surface of said deflector and laterally outward through the V-shaped outlet openings thereof and enhance the mixture of said ambient air with the products of combustion discharged through said inverted V-shaped outlet openings of said deflector.

References Cited in the file of this patent

UNITED STATES PATENTS

| | | |
|---|---|---|
| 273,169 | Segal | Feb. 27, 1883 |
| 900,303 | Panasevitch | Oct. 6, 1908 |
| 1,179,713 | Gallsworthy | Apr. 18, 1916 |
| 1,913,980 | Fisher | June 13, 1933 |
| 2,214,503 | Landis | Sept. 10, 1940 |

FOREIGN PATENTS

| | | |
|---|---|---|
| 531,948 | France | Nov. 3, 1951 |